United States Patent [19]

Skirvin

[11] Patent Number: 4,884,527

[45] Date of Patent: Dec. 5, 1989

[54] SELF-CONTAINED DISPOSABLE ANIMAL COMMODE

[76] Inventor: Marc A. Skirvin, 1430 W. Lunt, #305, Chicago, Ill. 60626

[21] Appl. No.: 98,237

[22] Filed: Sep. 18, 1987

[51] Int. Cl.4 .............................................. A01K 1/00
[52] U.S. Cl. ...................................................... 119/1
[58] Field of Search ..................................... 119/1, 19

[56] References Cited

U.S. PATENT DOCUMENTS

| 245,191 | 7/1977 | Gore | D30/1 |
| 273,718 | 5/1984 | Dugan | D30/1 |
| 3,793,989 | 2/1974 | Clark | 119/1 |
| 3,831,557 | 8/1974 | Elesh | 119/1 |
| 3,890,930 | 6/1975 | Clark | 119/1 |
| 4,711,198 | 12/1987 | Mossberger | 119/1 |

OTHER PUBLICATIONS

Readers Guide to Business Publications, Canadian Business, Aug. 1984.

*Primary Examiner*—Robert Peshock
*Attorney, Agent, or Firm*—Wood, Dalton, Phillips, Mason & Rowe

[57] ABSTRACT

A self-contained disposable animal commode is disclosed having a container with an access opening formed therein. The container includes a base portion defining a box-like receptacle having an open top and a cover portion cooperating with the base portion to define a substantially entirely enclosed space. The base portion of the container is adapted to support an animal for defecation and urination into a loose material and the cover portion of the container is movable from a collapsed position substantially conforming to the base portion to an expanded position. The container thus defines a substantially entirely enclosed space which can be collapsed for shipping and expanded for use. Additionally, the expanded position causes the cover portion to be positioned to comfortably receive the animal with the access opening positioned for ingress and egress of the animal therethrough.

17 Claims, 3 Drawing Sheets

SELF-CONTAINED DISPOSABLE ANIMAL COMMODE

FIELD OF THE INVENTION

The present invention generally relates to devices for the disposal of animal waste and, more particularly, to a self-contained disposable animal commode.

BACKGROUND OF THE INVENTION

Generally, there is a recognized need for acceptable products for satisfactory disposal of animal wastes. This is particularly true for domesticated animals such as cats and the like which conventionally live within the home without access to the out-of-doors for defecation and urination purposes. For this reason, there has developed a large market for diatomaceous material that is commonly referred to as "litter".

However, pet owners are well aware of the undesirable aspects of cat litter. Quite frequently, it is necessary for the pet owner to "change" the litter by removing feces and stirring or mixing the litter to disperse urine. In addition, the cat litter must be completely replaced at frequent intervals.

While this process is distasteful, there is still another problem of significant proportions. Namely, the box or container for the cat litter is usually an open-topped plastic receptacle which does nothing to contain odors or remove the litter and feces and urine therein from view. Furthermore, the cat litter is susceptible to spillage when the animal is attempting to bury the feces.

In order to overcome these problems, there have been a number of proposals of varying success. For instance, Clark U.S. Pat. No. 3,890,930 suggests an animal commode having a removable liner therein, Clark U.S. Pat. No. 3,793,989 suggests a pet relief station having means for distributing deodorizer associated therewith, and Gore U.S. Pat. No. Des. 245,191 proposes a housing for a cat litter box. However, despite these and other proposals, it has remained to provide a self-contained disposable animal commode.

The present invention is directed to overcoming the above-stated problems and accomplishing the stated objects by an entirely unique manner.

SUMMARY OF THE INVENTION

Accordingly, the present invention is directed to a self-contained disposable animal commode comprising container means having an access opening formed therein The container means defines a substantially entirely enclosed space and is collapsible for shipping and expansible for use. In addition, the container means includes a base portion defining a box-like receptacle having an open top and a cover portion cooperating with the base portion to define the substantially entirely enclosed space In order to be self-contained, the animal commode includes a loose material disposed in the base portion of the container means at the time of shipment for immediate use without the necessity of separately providing the "litter". It will also be appreciated that the base portion of the container means is adapted to support an animal for defecation and urination into the loose material, or litter, and the cover portion of the container means is movable from a collapsed position substantially conforming to the base portion to an expanded position for use of the animal commode. More particularly, the expanded position causes the cover portion to be positioned to comfortably receive the animal in the substantially entirely enclosed space and also causes the access opening to be positioned for ingress and egress of the animal therethrough.

In the exemplary embodiment, the box-like receptacle defining the base portion comprises a pan and the cover portion comprises a bag formed of flexible material. The pan is formed of a plastic material that is at least semirigid and has a continuous side wall integral with a bottom wall. Additionally, the bag is formed of at least one layer of a paper material having a flexible plastic lining so as to include a pair of side walls, a front wall, a back wall, and a bottom wall.

With this construction, the side walls of the bag are preferably integrally joined at top edges thereof and are integrally joined to the bottom wall on opposite sides of the pan. The front wall of the bag is advantageously joined in integral fashion at corresponding edges of the side walls and is also integrally joined to the bottom wall at one end of the pan. Furthermore, the front wall of the bag is preferably folded inwardly of the corresponding edges of the side walls at least adjacent top edges thereof.

Still further, the back wall of the bag is integrally joined at corresponding edges of the side walls and being integrally joined to the bottom wall at the other end of the pan. It is also advantageous for the back wall of the bag to be folded inwardly of the corresponding edges of the side walls at least adjacent top edges thereof. Still additionally, the access opening preferably includes a perforated panel in the front wall of the bag entirely concealed when the cover portion is in the collapsed position.

In an alternative embodiment, the box-like receptacle defining the base portion comprises a pan formed of a plastic material and the cover portion is formed of a plastic material integral with the base portion. The cover portion then advantageously includes a hinged side wall integral with a top wall thereof, and the hinged side wall renders the cover portion expansible and collapsible in accordian-like fashion. In this embodiment, the animal commode includes releasable means for securing the cover portion of the container means in the collapsed position with the access opening entirely concealed.

In another alternative embodiment, the box-like receptacle defining the base portion comprises a pan formed of cardboard and the cover portion is formed of cardboard integral with the base portion The cover portion in this embodiment includes a hinged front wall, a hinged rear wall, and a hinged top wall, and the access opening is disposed in the front wall and is entirely concealed when the cover portion is in the collapsed position. Moreover, the hinged top wall is integrally joined to the pan on one side thereof and includes means for securing the top wall to the other side of the pan when the cover portion is in the expanded position.

In this embodiment, the hinged front wall is integrally joined to one end of the pan and the hinged rear wall is integrally joined to the other end of the pan. Also, the animal commode of this embodiment includes means for securing the hinged front wall to the hinged top wall and means for securing the hinged rear wall to the hinged top wall when the cover portion is in the expanded position. Still further, at least the cardboard forming the cover portion includes a plastic lining material and the box-like receptacle defining the base portion includes a pan formed of a semi-rigid plastic material.

Still other objects, advantages and features of the present invention will become apparent from the following specification taken in conjunction with the accompanying drawings.

DETAILED DESCRIPTION OF THE PREFERRED EMBODIMENTS

Figure 1:
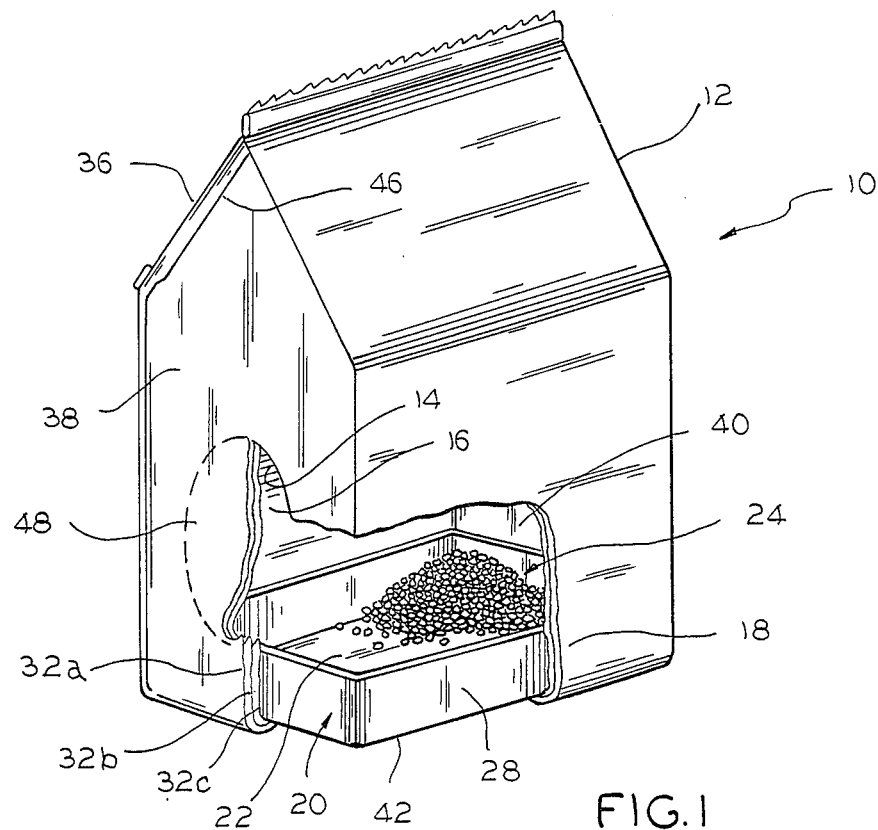
FIG. 1 is a perspective view, partially cut away, of a self-contained disposable animal commode in accordance with the present invention.

Referring the drawings, and first to FIG. 1, the reference numeral 10 designates generally a self-contained disposable animal commode in accordance with the present invention. The animal commode 10 includes container means generally designated 12 having an access opening 14 formed therein and defining a substantially entirely enclosed space 16. As will be appreciated by comparing FIGS. 1 and 2, the animal commode 10 is constructed such that the container means 12 is collapsible (see FIG. 2) for shipping and expansible (see FIG. 1) for use in a manner that will be described in detail hereinbelow.

Referring once again to FIG. 1, the container means 12 includes a base portion 18 defining a box-like receptacle 20 having an open top 22. A loose material 24 such as a diatomaceous material commonly referred to as "litter" is disposed in the base portion 18 of the container means 12. Moreover, the container means 12 also includes a cover portion 26 cooperating with the base portion 18 to define the substantially entirely enclosed space 16.

As will be appreciated, the base portion 18 of the container means 12 is adapted to support an animal for defecation and urination into the loose material 24 and the cover portion 26 of the container means 12 is movable from a collapsed position substantially conforming to the base portion 18 to an expanded position. In the expanded position illustrated in FIG. 1, the cover portion 26 is positioned to comfortably receive the animal in the substantially entirely enclosed space 16 and the access opening 14 is positioned for ingress and egress of the animal therethrough.

Figure 2:
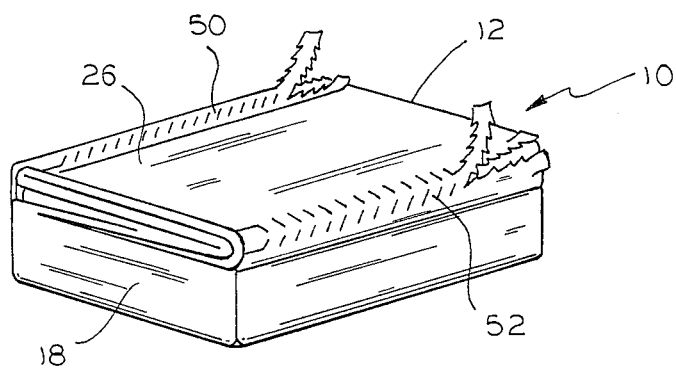
FIG. 2 is a perspective view of the animal commode of FIG. 1 in a collapsed position for shipping.

Still referring to FIGS. 1 and 2, the box-like receptacle 20 defining the base portion 18 preferably includes a separate pan and the cover portion 26 comprises a bag formed of flexible material. Preferably, the pan 20 is formed of a plastic material that is at least semi-rigid having a continuous side wall 28 integral with a bottom wall 30. Additionally, the bag 26 is formed of at least one and preferably a pair of layers 32a and 32b of a paper or semiflexible plastic material having a flexible plastic inner lining 32c.

Still referring to FIG. 1, the bag 26 has a pair of side walls 34 and 36, a front wall 38, a back wall 40, and a bottom wall 42. The side walls 34 and 36 of the bag 26 are integrally joined at top edges thereof as at 44 preferably by rolling the top edges and gluing or sewing them, and the side walls 34 and 36 are integrally joined to the bottom wall 42 on opposite sides of the pan 20. As will also be appreciated, the front wall 38 of the bag 26 is integrally joined at corresponding edges of the side walls 34 and 36 and is integrally joined to the bottom wall 42 at one end of the pan 20.

As shown in FIG. 1, the front wall 38 of the bag 26 is folded inwardly of corresponding edges of the side walls 34 and 36 as, e.g., at 46. This inward fold, which is present at least adjacent top edges of the side walls 34 and 36 and preferably extends downwardly and outwardly therefrom to the corresponding side edges of the side walls 34 and 36, is provided to accommodate folding of the cover portion 26 into the compact collapsed position illustrated in FIG. 2. In this manner, the access opening 14 defined by a perforated panel 48 is such that the perforated panel 48 is entirely concealed when the cover portion 26 is in the collapsed position.

While not shown, it will be appreciated that the back wall 40 of the bag 26 is integrally joined at corresponding edges of the side walls 34 and 36 in like fashion. Similarly, the back wall 40 is integrally joined to the bottom wall 42 at the other end of the pan 20. Additionally, the back wall 40 of the bag 26 is folded inwardly of the corresponding edges of the side walls 34 and 36 in like fashion.

Referring specifically to FIG. 2, the animal commode 10 preferably includes releasable means such as paper zip-strips 50 and 52 for securing the cover portion 26 of the container means 12 in the collapsed position. It will be appreciated that the paper zip strips can be of the type commonly utilized in many packaging applications or. Alternatively, other releasable means could also be employed, e.g., the respective edges of the cover portion 26 could be secured by sewing or the like.

Figure 3:
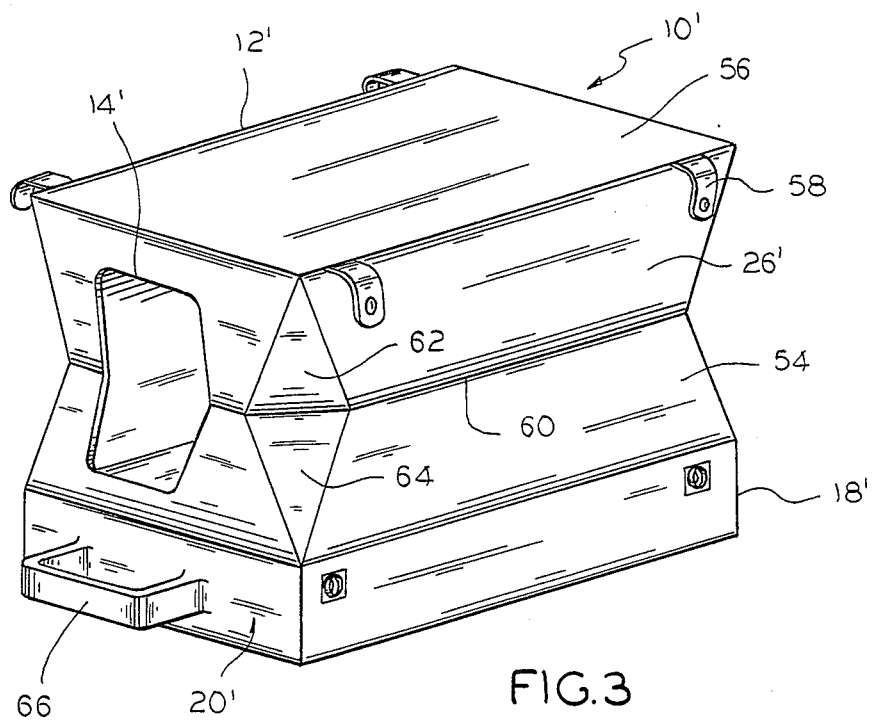
FIG. 3 is a perspective view of an alternative embodiment of animal commode in accordance with the present invention.

Referring to FIG. 3, an alternative embodiment of animal commode 10' is illustrated. The animal commode 10' is formed such that the box-like receptacle 20' defining the base portion 18' comprises a pan formed of a plastic material. In this embodiment, the cover portion 26' is also formed of a plastic material intergral with the base portion 18'.

Still referring to FIG. 3, the cover portion 26' includes a hinged side wall 54 integral with a top wall 56 thereof. The hinged side wall renders the cover portion 26' expansible and collapsible in accordian-like fashion such that the access opening 14', which is in the hinged side wall 54, is entirely concealed when the cover portion 26' is in the collapsed position. Moreover, in the embodiment illustrated in FIG. 3, releasable securing means in the form of snap tabs 58 are provided for securing the cover portion 26' of the container means 12' in the collapsed position.

Still referring to FIG. 3, the container means 12' can advantageously be formed of a blow-molded plastic material. Such a material is easy to form into the configuration illustrated so as to have a hinge line as at 60 and generally triangular corners such as 62 and 64 to accommodate moving the container means 12' from the collapsed position to the expanded position. Also, if desired, a handle 66 may be molded integrally with the base portion 18' to facilitate carrying the animal commode 10'.

Due to the inexpensive nature of the materials, the animal commode 10' can be shipped in a collapsed position with the top wall 56 in the plane defined by the top edge of the base portion 18'. The handle 66 accommodates not only carrying of the animal commode 10' by the consumer from the point of purchase to the home, but also carrying of the commode for later disposal thereof Of course, the snap tabs 58 maintain the cover portion 26' in the collapsed position and the entire container means 12' can initially be covered with a shrink wrap if desired.

Figure 4:
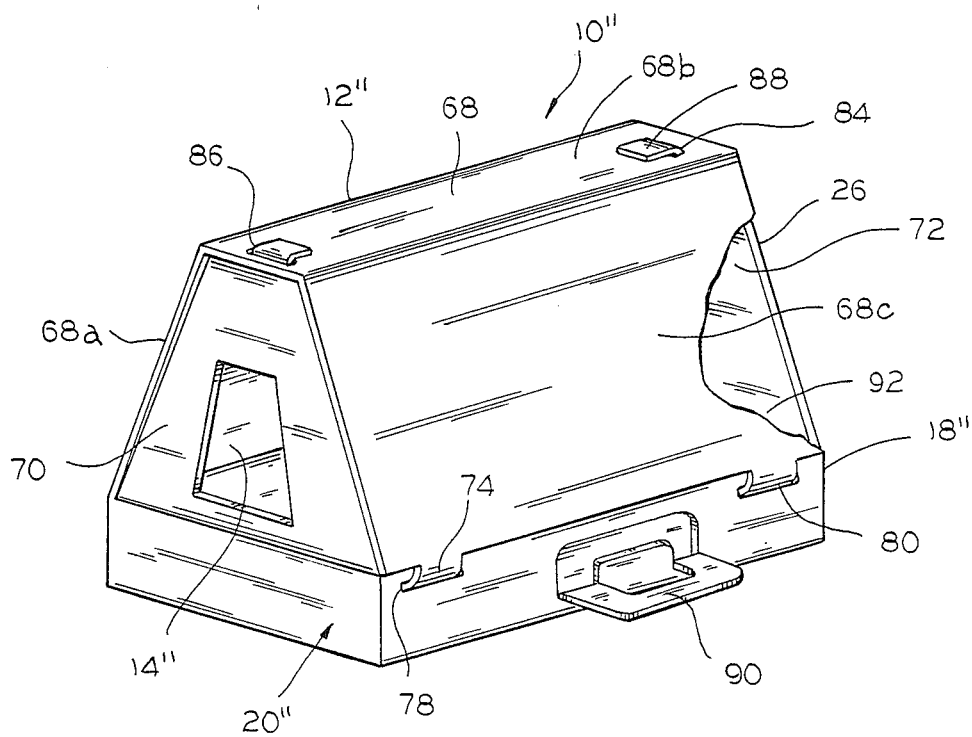
FIG. 4 is a perspective view of another alternative embodiment of animal commode in accordance with the present invention.

Referring to FIG. 4, the box-like receptacle 20'' defining the base portion 18'' comprises a pan formed of cardboard. The cover portion 26'' is also formed of cardboard integral with the base portion 18'' at least along one edge thereof. More specifically, the cover portion 26'' includes a hinged top wall 68 integrally joined to the pan 20'' on one side thereof.

Still referring to FIG. 4, the cover portion 26'' also includes a hinged front wall 70 and a hinged rear wall 72. The access opening 14'' is disposed in the front wall 70 and is entirely concealed when the cover portion 26'' is in the collapsed position In this connection, the hinged front wall 70 is integrally joined to one end of the pan 20'' and the hinged rear wall 72 is integrally joined to the other end of the an 20''.

By reason of the hinged nature of the front and rear walls 70 and 72, they can be folded over so as to lie substantially in the plane defined by the top edge of the pan 20''. Then, the top wall 68 can be folded in a manner in which it closely conforms to the plane defined by the top edge of the pan 20'' in a position concealing the front and rear walls 70 and 72 and, thus, the access opening 14'' in the front wall 70. Furthermore, the animal commode 10'' includes means for securing the top wall 68 to the other side of the pan 20'' when the cover portion 26'' of the container means 12'' is in the expanded position, i.e., the side opposite where the top wall 68 is hinged to the pan 20''.

With regard to the securing means, it preferably takes the form of tabs 74 and 76 and corresponding slots 78 and 80. Also, while not shown, the tabs 74 and 76 can cooperate with corresponding slots on the underside of the pan 20'' when the top wall 68 is folded in such manner that the top wall portion 68a lies substantially in the plane defined by the top edge of the pan 20''. With this construction, the top wall portion 68b is preferably dimensioned so as to be substantially identical in size to the wall portion of the pan 20'' bearing the slots 78 and 80 so that the top wall portion 68c may lie flat against the bottom wall of the pan 20''.

Also, as shown in FIG. 4, the top wall portion 68b preferably includes slots 82 and 84. These slots are adapted to receive the corresponding tabs 86 and 88 on the top edges of the front and rear walls 70 and 72, respectively, so as to maintain the container means 12'' in a fully assembled condition for use. Furthermore, as with the embodiment illustrated in FIG. 3, the pan 20'' can be provided with a die cut pop out handle 90.

In the embodiment illustrated in FIG. 3, there need be no lining within the interior of the container means 12'. This follows due to the fact that the container means 12' is preferably formed of a blow molded plastic material which provides an adequate lining against moisture and odors escaping from the animal commode 10'. However, with the embodiment illustrated in FIG. 4, the animal commode 10'' preferably includes a plastic lining material on the cardboard forming the cover portion 26'' and the box-like receptacle 20'' defining the base portion 18'' may include a separate pan 92 formed of a semi-rigid plastic material therewithin.

Figure 5:
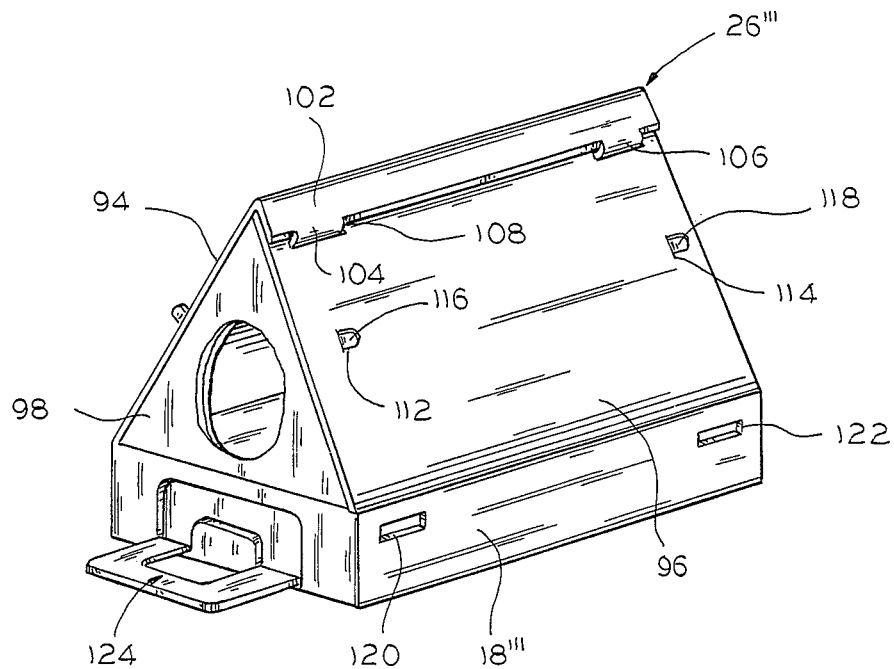
FIG. 5 is a perspective view of still another embodiment of animal commode in accordance with the present invention.

Referring to FIG. 5, still another embodiment of animal commode 10''' is illustrated. This embodiment is similar to that illustrated in FIG. 4 with the exception that the cover portion 26''' is comprised of a first top wall 94 hinged along one side of the base portion 18''' and a second top wall 96 hinged along the other side of the base portion 18'''. As before, the container means 12''' preferably includes a hinged front wall 98 and a hinged rear wall 100.

With this arrangement, the cover portion 26''' is such that one of the top wall portions 94 has a hinged flap 102 carrying tabs 104 and 106 adapted to be positioned in slots 108 and 110, respectively. These slots 108 and 110 are provided near the edge of the top wall portion 96 remote from the base portion 18''' after completing assembly of the animal commode 10'''. In addition, the top wall portions 94 and 96 include slots such as 112 and 114 adapted to receive tabs such as 116 and 118 on the front and rear walls 98 and 100, respectively.

In the collapsed position, the tabs 104 and 106 are adapted to cooperate with slots 120 and 122 in the corresponding wall portion of the base portion 18'''. Thus, the front and rear walls 98 and 100 may be folded inwardly to a level corresponding to a plane defined by the top edge of the base portion 18''' after which the wall portion 96 may be folded inwardly followed by folding the wall portion 94 over the wall portion 96 so as to also lie substantially in the plane defined by the top edge of the base portion 18'''. At this point, the flap 102 may be bent into contact with the corresponding wall portion of the base portion 18''' and the tabs 104 and 106 may be inserted into the slots 120 and 122.

As with the earlier embodiments, the base portion 18''' may include a die cut pop-out handle 124. It will also be appreciated that the animal commode 10''' can be maintained in a collapsed position by means of a shrink wrap or other suitable packaging technique. In any event, the animal commode 10''' can also include a plastic liner in the interior of the container means 12' and can include a plastic lining pan 126, if desired.

In all of the embodiments, the animal commode is advantageous since it is self-contained and disposable. It is also inexpensive to manufacture and ship and, thus, offers not only a solution to the problems set forth hereinabove but also an economical manner of dealing with animal waste from domesticated animals such as cats, and the like. Furthermore, the animal commode of the present invention accomplishes these objectives in a unique and attractive manner.

While in the foregoing there have been set forth preferred embodiments of the invention, it is to be understood that the invention is only to be limited by the spirit and scope of the appended claims.

I claim:

1. A self-contained disposable animal commode, comprising:

container means having an access opening formed therein, said container means defining a substantially entirely enclosed space, said container means being collapsible for shipping and expansible for use;

said container means including a base portion defining a box-like receptacle having an open top and a cover portion cooperating with said base portion to define said substantially entirely enclosed space; and a loose material disposed in said base portion of said container means;

said base portion of said container means being adapted to support an animal for defecation and urination into said loose material;

said cover portion of said container means being movable from a collapsed position substantially conforming to said base portion to an expanded portion;

said expanded position causing said cover portion to be positioned to comfortably receive said animal in said substantially entirely enclosed space, said expanded position also causing said access opening to be positioned for ingress and egress of said animal therethrough;

said box-like receptacle defining said base portion comprising a pan and said cover portion comprising a bag formed of flexible material, said bag being formed of a material having a flexible plastic inner surface, said bag having a pair of side walls, a front wall, a back wall, and a bottom wall, said front wall of said bag being integrally joined at corresponding edges of said side walls and to said bottom wall along one side of said pan;

said access opening including a perforated panel in one of said walls of said bag so as to be entirely concealed when said cover portion is in said collapsed position.

2. The self-contained disposable animal commode as defined by claim 1 wherein said pan is formed of a plastic material that is at least semi-rigid, said pan being formed with a continuous side wall integral with a bottom wall.

3. The self-contained disposable animal commode as defined by claim 1 wherein said side walls of said bag are integrally joined at the top edges thereof, said side walls being integrally joined to said bottom wall on opposites sides of said pan.

4. The self-contained disposable animal commode as defined by claim 1 wherein said front wall of said bag is folded inwardly of corresponding edges of said side walls, said front wall being folded inwardly at least adjacent top edges of said side walls.

5. The self-contained disposable animal commode as defined by claim 1 wherein said back wall of said bag is integrally joined at corresponding edges of said side walls, said back wall being integrally joined to said bottom wall at the other end of said pan.

6. The self-contained disposable animal commode as defined by claim 5 wherein said back wall of said bag is folded inwardly of corresponding edges of said side walls, said back wall being folded inwardly at least adjacent top edges of said side walls.

7. The self-contained disposable animal commode as defined by claim 1 including releasable means for securing said cover portion of said container means in said collapsed position, said access opening being entirely concealed when said cover portion is in said collapsed position.

8. The self-contained disposable animal commode as defined by claim 1 wherein said box-like receptacle defining said base portion comprises a pan formed of a plastic material, said cover portion being formed of a plastic material integral with said base portion.

9. The self-contained disposable animal commode as defined by claim 8 wherein said cover portion includes a hinged side wall integral with a top wall thereof, said hinged side wall rendering said cover portion expansible and collapsible in accordian-like fashion.

10. The self-contained disposable animal commode as defined by claim 9 including releasable means for securing said cover portion of said container means in said collapsed position, said access opening being entirely concealed when said cover portion is in said collapsed position.

11. A self-contained disposable animal commode, comprising:

container means having an access opening formed therein, said container means defining a substantially entirely enclosed space, said container means being collapsible for shipping and expansible for use;

said container means including a base portion defining a box-like receptacle having an open top and a cover portion cooperating with said base portion to define said substantially entirely enclosed space; and a loose material disposed in said base portion of said container means;

said base portion of said container means being adapted to support an animal for defecation and urination into said loose material;

said cover portion of said container means being movable from a collapsed position substantially conforming to said base portion to an expanded position;

said expanded position causing said cover portion to be positioned to comfortably receive said animal in said substantially entirely enclosed space, said expanded position also causing said access opening to be positioned for ingress and egress of said animal therethrough;

said box-like receptacle defining said base portion comprising a pan formed of cardboard, said cover portion being formed of cardboard integral with said base portion, said cover portion including a hinged front wall, a hinged rear wall, and a hinged top wall, said access opening being disposed in said front wall and being entirely concealed when said cover portion is in said collapsed position.

12. The self-contained disposable animal commode as defined by claim 11 wherein said hinged top wall is integrally joined to said pan on one side thereof, and including means for securing said top wall to the other side of said pan when said cover portion is in said expanded position.

13. The self-contained disposable animal commode as defined by claim 12 wherein said hinged front wall is integrally joined to one end of said pan and said hinged rear wall being integrally joined to the other end of said pan.

14. The self-contained disposable animal commode as defined by claim 13 including means for securing said hinged front wall to said hinged top wall and means for securing said hinged rear wall to said hinged top wall when said cover portion is in said expanded position.

15. The self-contained disposable animal commode as defined by claim 2 wherein at least said cardboard forming said cover portion includes a plastic lining material and wherein said box-like receptacle defining said base portion includes a pan formed of a semi-rigid plastic material.

16. A self-contained disposable animal commode, comprising:

container means having an access opening formed therein, said container means defining a substantially entirely enclosed space, said container means being collapsible for shipping and expansible for use;

said container means including a base portion defining a box-like receptacle having an open top and a cover portion cooperating with said base portion to define said substantially entirely enclosed space; and a loose material disposed in said base portion of said container means;

said base portion of said container means being adapted to support an animal for defecation and urination into said loose material;

said cover portion of said container means being movable from a collapsed position substantially conforming to said base portion to an expanded position;

said expanded position causing said cover portion to be positioned to comfortably receive said animal in said substantially entirely enclosed space, said expanded position also causing said access opening to be positioned for ingress and egress of said animal therethrough;

said box-like receptacle defining said base portion comprising a pan and said cover portion comprising a bag formed of flexible material, said bag being formed of a material having a flexible plastic inner surface, said bag having a pair of side walls, a front wall, a back wall, and a bottom wall, said front wall of said bag being integrally joined at corresponding edges of said side walls and integrally joined to said bottom wall at one end of said pan, at least said front wall of said bag being folded inwardly of corresponding edges of said side walls at least adjacent top edges thereof.

17. A self-contained disposable animal commode as defined by claim 16 wherein said bag is formed of at least one layer of a paper material having a flexible plastic inner lining.

* * * * *